(12) United States Patent
Saji et al.

(10) Patent No.: US 10,259,053 B2
(45) Date of Patent: Apr. 16, 2019

(54) CUTTING INSERT AND INDEXABLE CUTTING TOOL

(71) Applicant: TUNGALOY CORPORATION, Fukushima (JP)

(72) Inventors: Ryuichi Saji, Iwaki (JP); Yosuke Yamada, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 20 days.

(21) Appl. No.: 15/554,646

(22) PCT Filed: Apr. 5, 2016

(86) PCT No.: PCT/JP2016/061051
§ 371 (c)(1),
(2) Date: Aug. 30, 2017

(87) PCT Pub. No.: WO2016/163341
PCT Pub. Date: Oct. 13, 2016

(65) Prior Publication Data
US 2018/0043444 A1 Feb. 15, 2018

(30) Foreign Application Priority Data
Apr. 6, 2015 (JP) .................. 2015-077361

(51) Int. Cl.
*B23C 5/20* (2006.01)
*B23C 5/06* (2006.01)

(52) U.S. Cl.
CPC .................. *B23C 5/06* (2013.01); *B23C 5/20* (2013.01); *B23C 5/202* (2013.01); *B23C 5/207* (2013.01);
(Continued)

(58) Field of Classification Search
CPC ........ B23C 2200/128; B23C 2210/287; B23C 2250/16; B23C 5/06; B23C 5/20;
(Continued)

(56) References Cited

U.S. PATENT DOCUMENTS 3,636,602 A * 1/1972 Owen ..................... B23C 5/207
407/113
4,068,976 A * 1/1978 Friedline ................. B23C 5/207
407/114
(Continued)

FOREIGN PATENT DOCUMENTS

GB 2054427 A * 2/1981 ............. B23C 5/207
JP 02095508 A * 4/1990 ........... B23B 27/143
(Continued)

OTHER PUBLICATIONS

International Preliminary Report on Patentability and Written Opinion issued in PCT/JP2016/061051 dated Oct. 10, 2017.
(Continued)

*Primary Examiner* — Sara Addisu
(74) *Attorney, Agent, or Firm* — Studebaker & Brackett PC

(57) ABSTRACT

A cutting insert including first cutting edges and second cutting edges respectively formed in a first end surface and a second end surface which are opposed to each other; at least one groove formed in a peripheral side surface which connects the first end surface and the second end surface; and, while one end of the groove reaches the first end surface, another end thereof reaches the second end surface, and an opening width in the first end surface is different from an opening width in the second end surface.

7 Claims, 9 Drawing Sheets

(52) U.S. Cl.
CPC .. *B23C 2200/128* (2013.01); *B23C 2200/203* (2013.01); *B23C 2210/287* (2013.01); *B23C 2250/16* (2013.01)

(58) Field of Classification Search
CPC ... B23C 2200/203; B23C 5/202; B23C 5/207; Y10T 407/23; Y10T 407/1924; Y10T 409/303752
See application file for complete search history.

(56) References Cited

U.S. PATENT DOCUMENTS

| | | | | |
|---|---|---|---|---|
| 4,194,862 | A * | 3/1980 | Zweekly | B23B 51/0493 408/224 |
| 4,248,555 | A * | 2/1981 | Satou | B23B 51/048 408/186 |
| 4,648,760 | A * | 3/1987 | Karlsson | B23B 27/141 407/113 |
| 4,681,486 | A * | 7/1987 | Hale | B23B 27/141 407/114 |
| 4,867,616 | A * | 9/1989 | Jakubowicz | B23C 5/08 407/58 |
| 5,085,542 | A * | 2/1992 | Nakayama | B23B 27/141 407/114 |
| 5,221,164 | A * | 6/1993 | Allaire | B23C 5/207 407/113 |
| 5,549,424 | A * | 8/1996 | Bernadic | B23B 27/065 407/100 |
| 5,779,401 | A * | 7/1998 | Stallwitz | B23B 27/045 407/11 |
| 5,791,832 | A * | 8/1998 | Yamayose | B23C 5/109 407/113 |
| 5,947,650 | A * | 9/1999 | Satran | B23C 5/00 407/113 |
| 6,135,681 | A * | 10/2000 | Nuzzi | B23B 51/0009 407/116 |
| 6,238,146 | B1 * | 5/2001 | Satran | B23B 27/1614 407/113 |
| 6,632,051 | B1 * | 10/2003 | Wermeister | B23B 27/065 407/114 |
| 7,008,145 | B2 * | 3/2006 | Astrakhan | B23C 5/006 407/113 |
| 7,549,824 | B2 * | 6/2009 | Agic | B23B 27/16 407/113 |
| 7,591,614 | B2 * | 9/2009 | Craig | B23C 5/109 407/113 |
| 8,025,465 | B2 * | 9/2011 | Ishida | B23C 5/06 407/113 |
| 8,029,213 | B2 * | 10/2011 | Tanaka | B23C 5/207 407/113 |
| 8,337,123 | B2 * | 12/2012 | Ishida | B23C 5/06 407/113 |
| 8,931,979 | B2 * | 1/2015 | Choi | B23C 5/06 407/113 |
| 2002/0189414 | A1 | 12/2002 | Knapp | |
| 2004/0240949 | A1 * | 12/2004 | Pachao-Morbitzer | B23B 27/065 407/11 |
| 2008/0260476 | A1 * | 10/2008 | Ishida | B23C 5/06 407/114 |
| 2009/0188356 | A1 * | 7/2009 | Ishida | B23C 5/06 83/53 |
| 2010/0092253 | A1 * | 4/2010 | Ishida | B23C 5/06 407/42 |
| 2010/0247252 | A1 * | 9/2010 | Hatta | B23C 5/109 407/42 |
| 2011/0027027 | A1 * | 2/2011 | Hatta | B23C 5/109 408/1 R |
| 2011/0070038 | A1 * | 3/2011 | Ishida | B23C 5/06 407/42 |
| 2011/0081210 | A1 * | 4/2011 | Ishida | B23C 5/207 407/42 |
| 2011/0135407 | A1 | 6/2011 | Koga | |
| 2012/0294686 | A1 * | 11/2012 | Ishida | B23C 5/06 409/132 |
| 2015/0196963 | A1 * | 7/2015 | Bhagath | B23C 5/1045 407/42 |
| 2015/0306687 | A1 * | 10/2015 | Choi | B23C 5/2213 407/33 |
| 2017/0216940 | A1 * | 8/2017 | Aso | B23C 5/109 |

FOREIGN PATENT DOCUMENTS

| | | | |
|---|---|---|---|
| JP | 2002-518192 A | | 6/2002 |
| JP | 2006218617 A | * | 8/2006 |
| JP | 2008-238342 A | | 10/2008 |
| JP | 2008254127 A | * | 10/2008 |
| JP | 2010-149234 A | | 7/2010 |
| JP | 2011-016225 A | | 1/2011 |
| JP | 2011-025407 A | | 2/2011 |

OTHER PUBLICATIONS

International Search Report issued in PCT/JP2016/061051; dated Jun. 7, 2016.

* cited by examiner

CUTTING INSERT AND INDEXABLE CUTTING TOOL

TECHNICAL FIELD

The present invention relates to a cutting insert and an indexable cutting tool which are used in cutting.

BACKGROUND ART

A conventional cutting insert comprises grooves (also referred to as "nicks") which extend so as to separate cutting edges into pieces. For example, Patent Document 1 discloses a cutting insert comprising: an upper surface and a lower surface which are opposed to each other; a peripheral side surface which extends therebetween; a through hole which extends so as to penetrate the upper and lower surfaces; and cutting edges which are formed in an intersecting edge between the upper surface and the peripheral side surface. In this cutting insert, each major cutting edge is provided with three grooves so as to be divided into four portions. Each groove extends in a flank of the peripheral side surface so as to be parallel to an axis of the through hole. These grooves separate each major cutting edge into portions, whereby chips which are to be produced can be made smaller.

CITATION LIST

Patent Documents

Patent Document 1: JP2008-238342 A

SUMMARY

Technical Problem

The above-described conventional cutting insert provided with nicks has lower resistance applied during cutting than that involved in a cutting insert not provided with nicks, leading to an enhanced chatter suppression effect. In recent years, cutting conditions have been becoming more severe in order to further improve productivity, and thus, there has been an increasing demand for a further improved chatter suppression effect.

The present invention provides a cutting insert and an indexable cutting tool which have an excellent chatter suppression effect.

Solution to Problem

A cutting insert according to an aspect of the present invention is a cutting insert comprising: a first end surface and a second end surface which are opposed to each other; a peripheral side surface which connects the first end surface and the second end surface; a first cutting edge which is formed in an intersecting edge between the first end surface and the peripheral side surface; a second cutting edge which is formed in an intersecting edge between the second end surface and the peripheral side surface; and at least one groove which is formed in the peripheral side surface and in which, while one end thereof reaches the first end surface, another end thereof reaches the second end surface, wherein a predetermined groove from among the at least one groove divides the first cutting edge into portions and divides the second cutting edge into portions, and is formed such that an opening width in the first end surface is different from an opening width in the second end surface.

The predetermined groove of the cutting insert of the present invention preferably includes: a linear groove part which extends with a constant width; and a width varying part which leads to the linear groove part and has a varying width.

It is preferable that the width varying part of the cutting insert of the present invention has a first edge which extends parallel to the linear groove part and a second edge which does not extend parallel to the first edge so as to involve a width variation.

It is preferable that: the linear groove part of the cutting insert of the present invention is opened in the first end surface; and the width varying part has a width different from a width of the linear groove part and further leads to a second linear groove part which is opened in the second end surface.

In the cutting insert of the present invention, it is preferable that: the first end surface has a substantially polygonal shape; the first cutting edge comprises a corner cutting edge formed in a first corner and a major cutting edge which leads to the corner cutting edge and which extends toward a second corner adjacent to the first corner; and, when the cutting insert is viewed from a direction facing the peripheral side surface, the major cutting edge is formed so as to be curved in a recessed shape toward the second end surface and such that a portion thereof closest to the second end surface is located substantially at a mid-point between the first corner and the second corner.

In the cutting insert of the present invention, it is preferable that: a plurality of first cutting edges is provided in the intersecting edge between the first end surface and the peripheral side surface; a plurality of second cutting edges is provided in the intersecting edge between the second end surface and the peripheral side surface; and, when defining a first axis which extends so as to penetrate the first end surface and the second end surface, the plurality of first cutting edges related to the first end surface and the plurality of second cutting edges related to the second end surface are of rotational symmetry with respect to the first axis.

In the cutting insert of the present invention, it is preferable that, when an end surface view of the first end surface and an end surface view of the second end surface are superimposed, an opening of the groove of the first end surface is not superimposed on an opening of the groove of the second end surface.

An indexable cutting tool according to the present invention comprises: the cutting insert according to the present invention; and a body comprising at least two insert mounting parts on each of which the cutting insert is removably mounted, wherein: the cutting insert is fixed to a first insert mounting part, out of the at least two insert mounting parts, such that the first cutting edge serves as an active cutting edge; and the cutting insert is fixed to a second insert mounting part, out of the at least two insert mounting parts, such that the second cutting edge serves as an active cutting edge.

DESCRIPTION OF EMBODIMENTS

Figure 1:
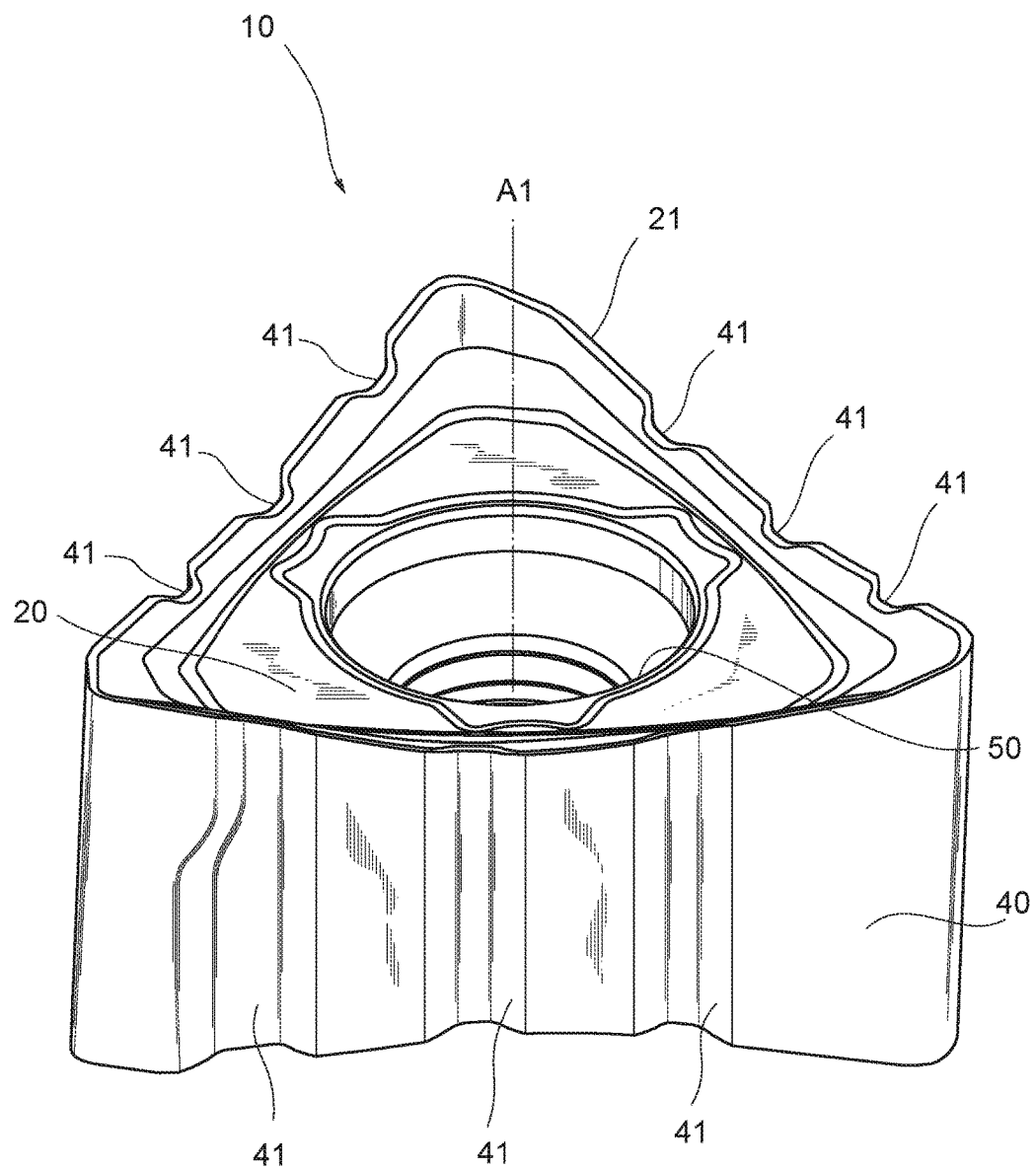
FIG. 1 is a perspective view of a cutting insert according to a first embodiment of the present invention.
Figure 2:
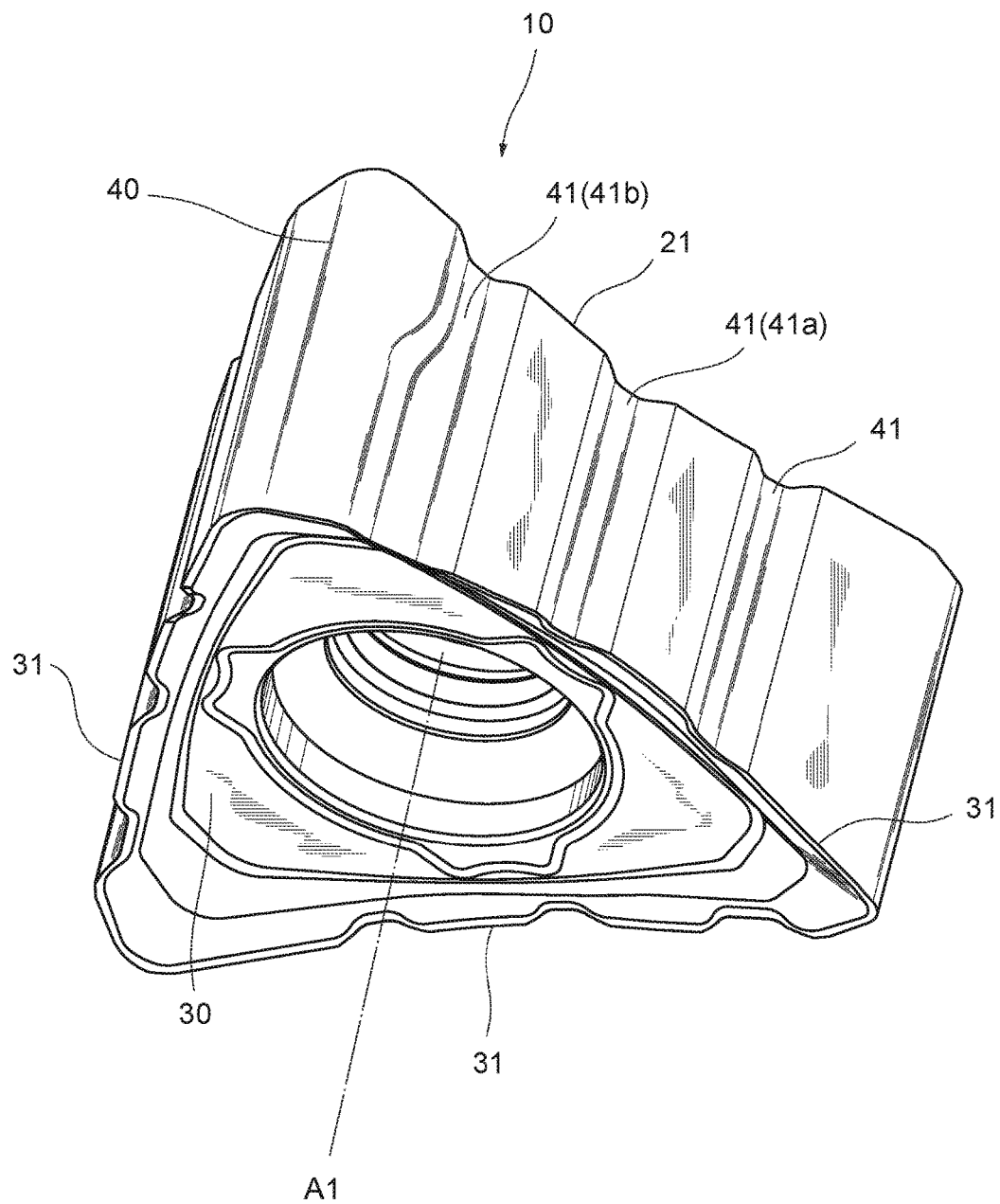
FIG. 2 is a perspective view of the cutting insert of FIG. 1, as viewed from another angle.

An embodiment of the present invention will hereinafter be described with reference to the attached drawings. A cutting insert 10 according to the embodiment of the present invention is shown in FIGS. 1 to 5. The cutting insert 10 is formed for square shoulder milling. The cutting insert 10 comprises two end surfaces 20, 30 which are opposed to each other and a peripheral side surface 40 which connects these two end surfaces 20, 30. In order to facilitate the understanding of the description, one end surface 20 of the end surfaces and the other end surface 30 thereof are hereinafter respectively referred to as an upper surface 20 and a lower surface 30. It should be noted that either of the two end surfaces 20, 30 may correspond to a first end surface of the present invention, and the remaining end surface may correspond to a second end surface of the present invention. Further, the terms "upper" and "lower" which indicate the relative positional relationship between objects or between portions may be used in the below description, but such terms merely indicate the positional relationships in the drawings referred to and do not describe the absolute positional relationships thereof.

The cutting insert 10 comprises a through hole 50 which is opened in the upper surface 20 and the lower surface 30. The peripheral side surface 40 is formed so as to extend substantially parallel to a central axis Al of the through hole 50. In other words, the cutting insert 10 is a so-called negative type cutting insert.

When the cutting insert 10 is viewed from a direction facing the upper surface 20 (i.e., in FIG. 3), the upper surface 20 has a shape closely analogous to a triangle. Thus, the upper surface 20 is provided with three corners 28. The upper surface 20 has a shape of 120-degree rotational symmetry to the central axis Al of the through hole 50.

Similarly to the upper surface 20, when the cutting insert 10 is viewed from a direction facing the lower surface 30 (i.e., in FIG. 4), the lower surface 30 also has a shape closely analogous to a triangle and is provided with three corners 38. As described below, grooves 41 are formed in the peripheral side surface 40, and thus, the upper surface 20 and the lower surface 30 differ from each other in terms of their side edge shapes. However, a contour shape of the upper surface 20 when the grooves 41 are not formed matches a contour shape of the lower surface 30 when the grooves 41 are not formed. Therefore, assuming that the grooves 41 are not formed, the upper surface 20 is 180-degree rotationally symmetrical with the lower surface 30 around an axis A2 which is defined so as to be orthogonal to the central axis A1 and to penetrate the peripheral side surface 40. The lower surface 30 has a shape of 120-degree rotational symmetry to the central axis A1 of the through hole 50. It should be noted that the axis A2 shown in FIG. 3 merely serves as an example.

Corresponding to the upper surface 20 being provided with the three corners 28, three cutting edges (hereinafter, upper cutting edges) 21 are formed in an intersecting edge between the upper surface 20 and the peripheral side surface 40. Similarly, corresponding to the lower surface 30 being provided with the three corners 38, three cutting edges (hereinafter, lower cutting edges) 31 are formed in an intersecting edge between the lower surface 30 and the peripheral side surface 40.

Figure 3:
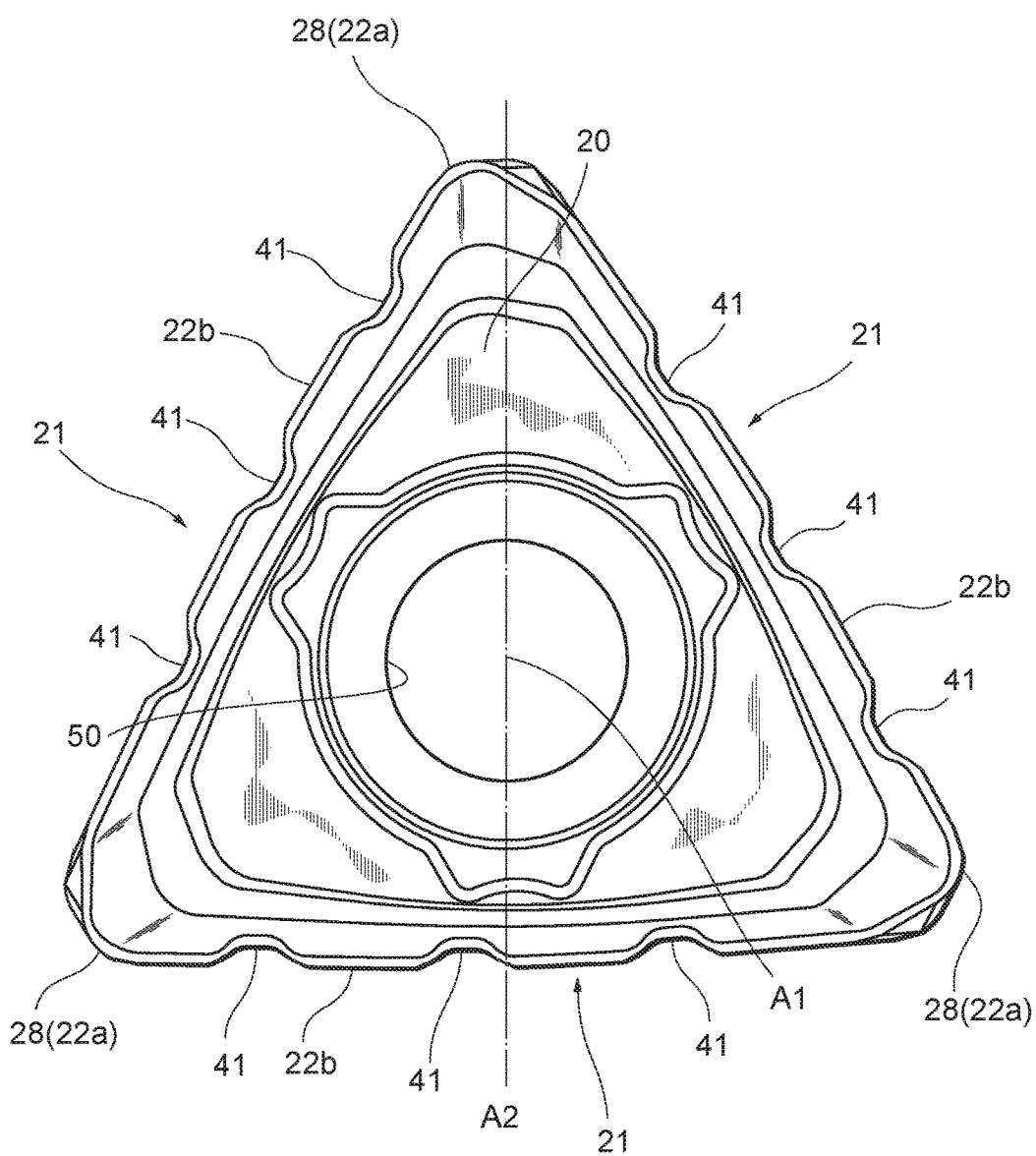
FIG. 3 is a top view of the cutting insert of FIG. 1.
Figure 4:
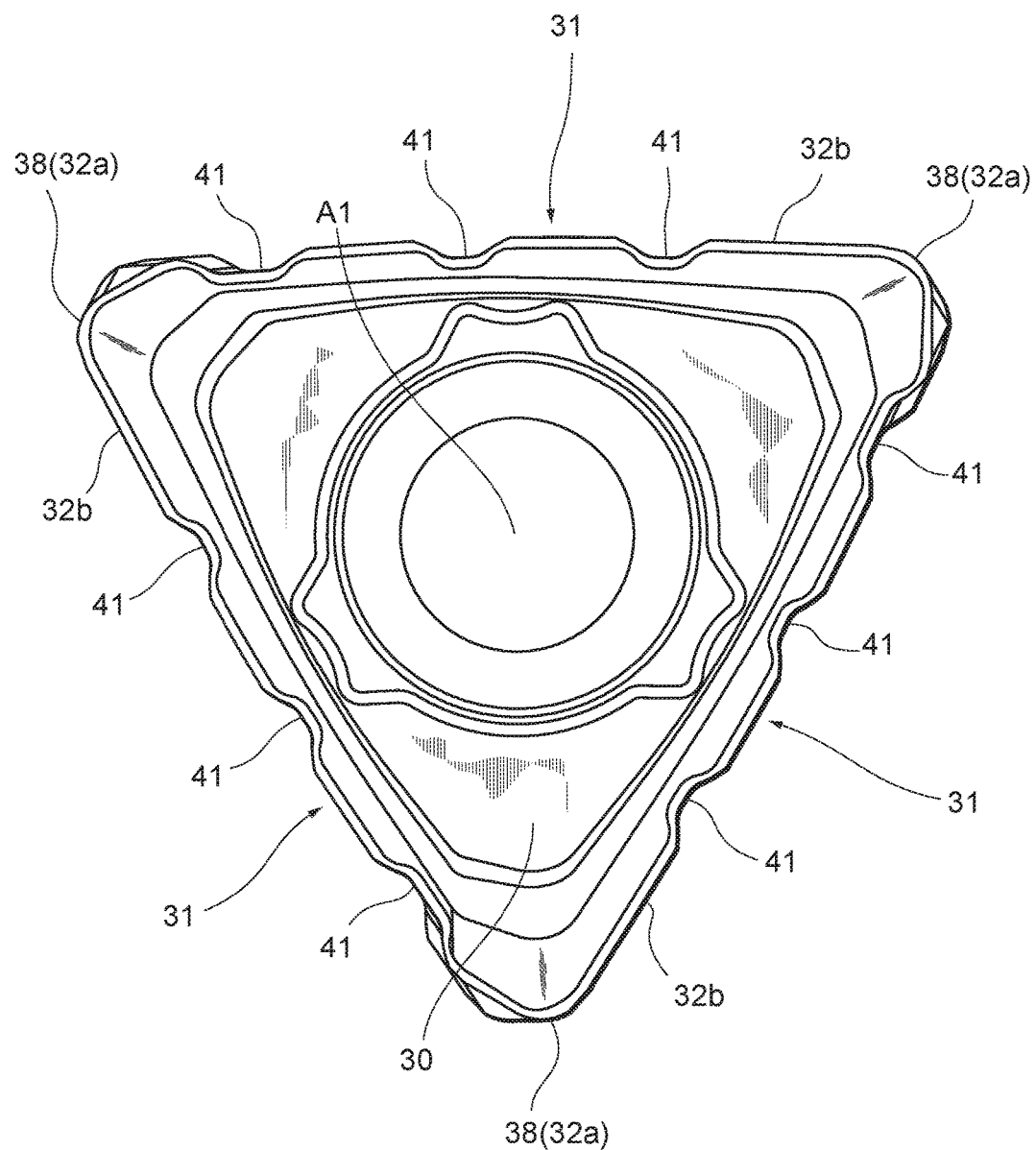
FIG. 4 is a bottom view of the cutting insert of FIG. 1.

Each upper cutting edge 21 has a corner cutting edge 22a and a major cutting edge 22b. The corner cutting edge 22a extends in the corner 28. The major cutting edge 22b extends in a side edge between the two adjacent corners 28. The cutting insert 10 is intended for square shoulder milling, and thus, as shown in FIG. 3, the major cutting edge 22b is formed so as to be curved in a projecting shape outward from the cutting insert 10 as viewed from the upper surface. This allows a wall to be machined at a higher degree of squareness.

Each lower cutting edge 31 has the same configuration as that of each cutting edge 21. The lower cutting edge 31 has a corner cutting edge 32a and a major cutting edge 32b. The corner cutting edge 32a extends in the corner 38. The major cutting edge 32b extends in a side edge between the two adjacent corners 38. The major cutting edge 32b of the lower cutting edge 31 is also formed so as to be curved in a projecting shape outward from the cutting insert 10, similarly to the major cutting edge 22b of the upper cutting edge 21.

The grooves 41 each of which reaches the upper and lower surfaces 20, 30 are formed in the peripheral side surface 40. These grooves 41 are formed in side surface portions 40a of the peripheral side surface 40, with each of such side surface portions 40a extending between the corresponding major cutting edges 22b and 32b placed in a direction of the central axis Al for the upper and lower surfaces 20, 30.

The cutting insert 10 includes three side surface portions 40a, and each side surface portion 40a is provided with three grooves 41. Therefore, each side edge of the upper surface 20 (i.e., each major cutting edge 22b) is provided with three notches, and each side edge of the lower surface 30 (i.e., each major cutting edge 32b) is provided with three notches.

As described above, except for the configuration concerning the grooves 41, the upper surface 20 is rotationally symmetrical with the lower surface 30 to the axis A2, and thus, the below description will be made centering on the upper surface 20. As to the lower surface 30, the description of the parts common to the upper surface 20 is omitted here, and only the differences from the upper surface 20 will be described below. Further, the grooves 41 are so-called "nicks" and are therefore referred to as "nicks" in the below description.

The cutting insert 10 comprises the three upper cutting edges 21 on the upper surface 20 side and comprises the three lower cutting edges 31 on the lower surface 30 side. Therefore, the cutting insert 10 comprises six cutting edges, and this allows the cutting insert 10 to be used at least six times. When the cutting insert 10 is mounted on a tool body described below, such that any one cutting edge out of the upper cutting edges 21 and the lower cutting edges 31 serves as an active cutting edge, part of the upper surface 20 or the lower surface 30 functions as a rake surface, and part of the peripheral side surface 40 functions as a flank.

Figure 5:
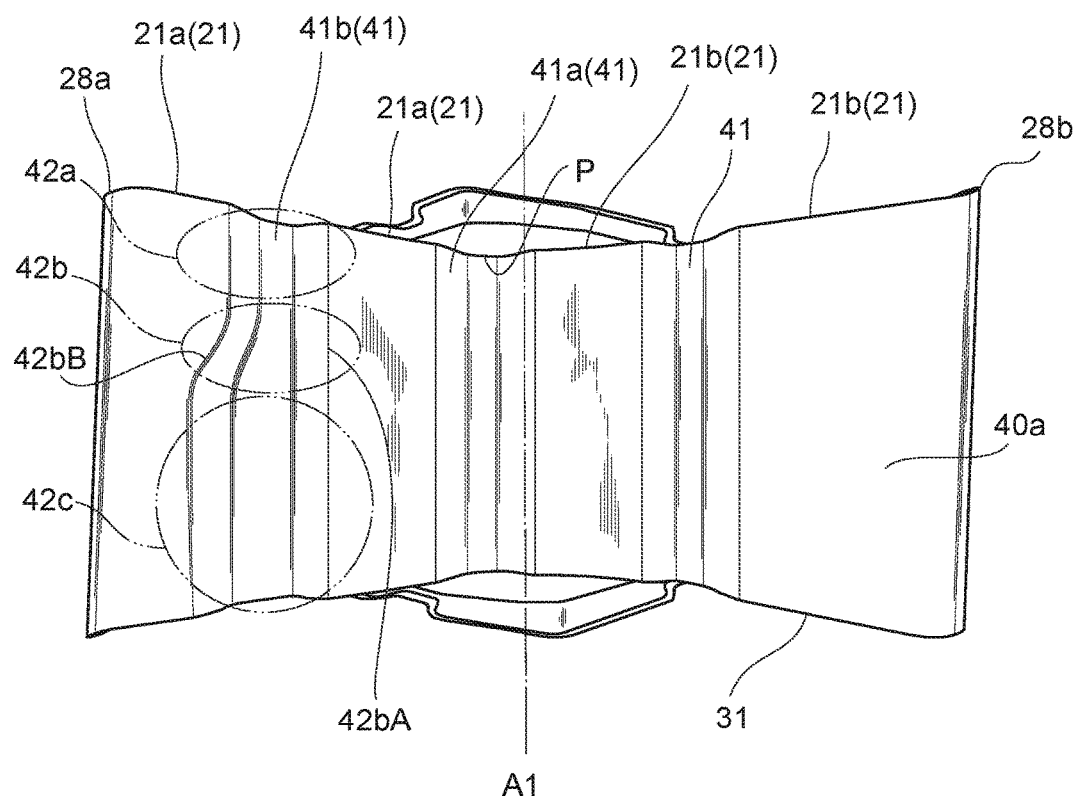
FIG. 5 is a front view of the cutting insert of FIG. 1.

As shown in FIG. 5, when the cutting insert 10 is seen from a side view, in particular, when the cutting insert 10 is viewed from a direction facing the side surface portion 40a, each upper cutting edge 21 comprises: a first inclined part 21a which is inclined from the upper surface 20 toward the lower surface 30; and a second inclined part 21b which is, as opposed to the first inclined part 21a, inclined from the lower surface 30 toward the upper surface 20. Thus, when collectively regarding the upper cutting edge 21 and an intersecting edge between bottoms of the nicks 41 and the upper surface 20 as one smoothly continued virtual edge, the virtual edge is curved so as to be recessed toward the lower surface 30. In the cutting insert 10, a portion P (lowest point), being located closest to the lower surface 30, of the virtual edge is near a mid-point between two adjacent corners 28a and 28b.

The nicks 41 provided in the peripheral side surface 40 are each opened in the upper and lower surfaces 20, 30. Each nick 41 extends, in general, parallel to the central axis A1. As shown in FIG. 5, a center nick 41a from among the three nicks 41 concerning one major cutting edge 22b is positioned so as to cover the lowest point P. More specifically, the lowest point P of the virtual edge is located at an intersection between a bottom of the nick 41a and the upper surface 20.

Figure 7:
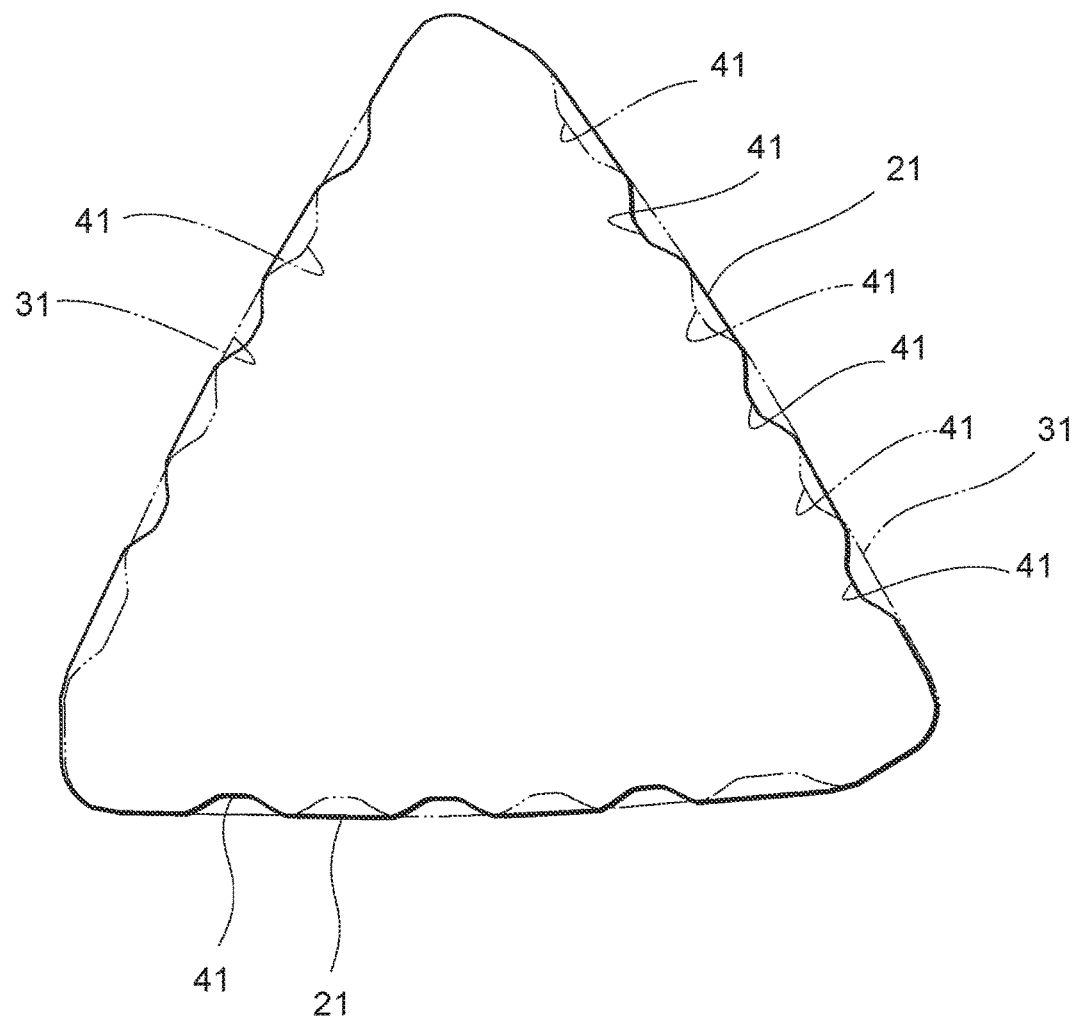
FIG. 7 is a schematic view showing a state in which the contour shape of an upper surface and the contour shape of a lower surface are superimposed.

When seen from a side view (i.e., in FIG. 5), the nicks 41 are not arranged so as to constitute bilateral symmetry to the mid-point between the two corners 28a and 28b. In other words, the three nicks 41 concerning one upper cutting edge 21 are formed, on the whole, so as to be closer to the corner 28a on the left side in FIG. 5. FIG. 7 is a view in which a schematic view showing the contour shape, in FIG. 3, of the upper surface 20 and a schematic view showing the contour shape, in FIG. 4, of the lower surface 30 are arranged such that the corners in one of the schematic views are superimposed on the corners in the other schematic view. As shown in FIG. 7, the nicks 41 are, as described above, formed so as to be closer to one corner, whereby the positions of the nicks 41 viewed from the upper surface 20 side and the positions of the nicks 41 viewed from the lower surface 30 side are not superimposed and deviate from one another. Therefore, portions that remain uncut are not produced when a workpiece is machined with the cutting insert 10 being mounted on the body.

Figure 6:
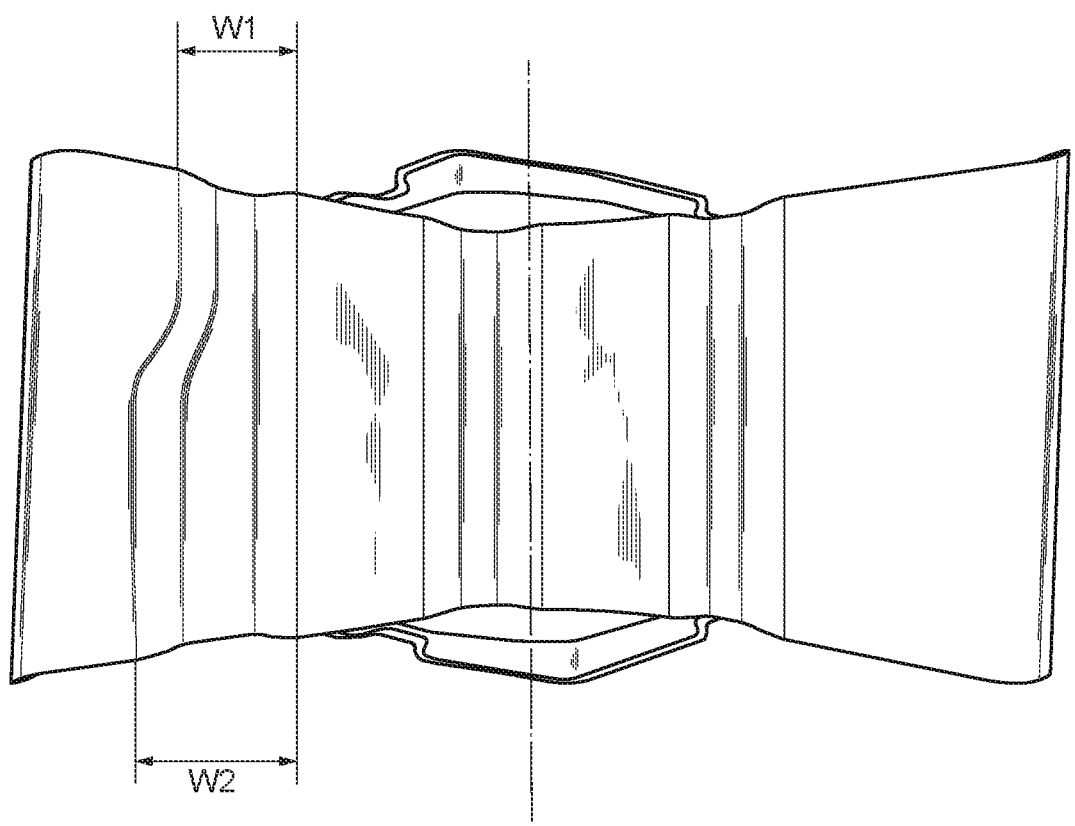
FIG. 6 is a front view of the cutting insert of FIG. 1, the view explaining the width of each of the parts of a nick.

As shown in FIGS. 5 and 6, focusing on one upper cutting edge 21, a nick (predetermined groove) 41b which is located closest to the corner 28a has a shape different from that of the other nicks 41. For example, the center nick 41a of the three nicks is configured so as to have a cross-sectional shape which does not vary in the direction of the central axis A1. Meanwhile, the nick 41b has a special shape whose cross-sectional shape varies between the upper surface 20 and the lower surface 30 so as to be widened, in an area located therebetween, from the upper surface 20 toward the lower surface 30. More specifically, the nick 41b comprises a first linear groove part 42a with a groove width W1, a width varying part 42b which is widened from the upper surface 20 toward the lower surface 30, and a second linear groove part 42c with a groove width W2. The first linear groove part 42a has an upper end which reaches the upper surface 20, and the first linear groove part 42a extends parallel to a thickness direction of the cutting insert 10, i.e., the central axis A1, while the groove width W1 is kept constant. The width varying part 42b is connected to the first linear groove part 42a and the second linear groove part 42c. In this width varying part 42b, one edge 42bA (the edge which is distant from the corner 28a) extends along the above-mentioned central axis Al while another edge 42bB (the edge which is close to the corner 28a) is inclined in a direction in which the nick 41b is widened from the upper surface 20 toward the lower surface 30. The second linear groove part 42c extends parallel to the central axis A1 while the groove width W2 at a lower end of the width varying part 42b is kept constant.

The groove width W2 at an opening of the nick 41b in the lower surface 30 is greater than the groove width W1 at an opening in the upper surface 20 and is substantially twice as wide as the groove width W1. It should be noted, regarding nicks, that the term "parallel" herein does not mean being parallel in a strict sense and that such term refers to the concept of allowing for an inclination of approximately ±1° with respect to the axis Al. It should also be noted that the nicks (including the nick 41a) other than the nick 41b are formed, in general, so as to have the groove width W1.

Figure 8:
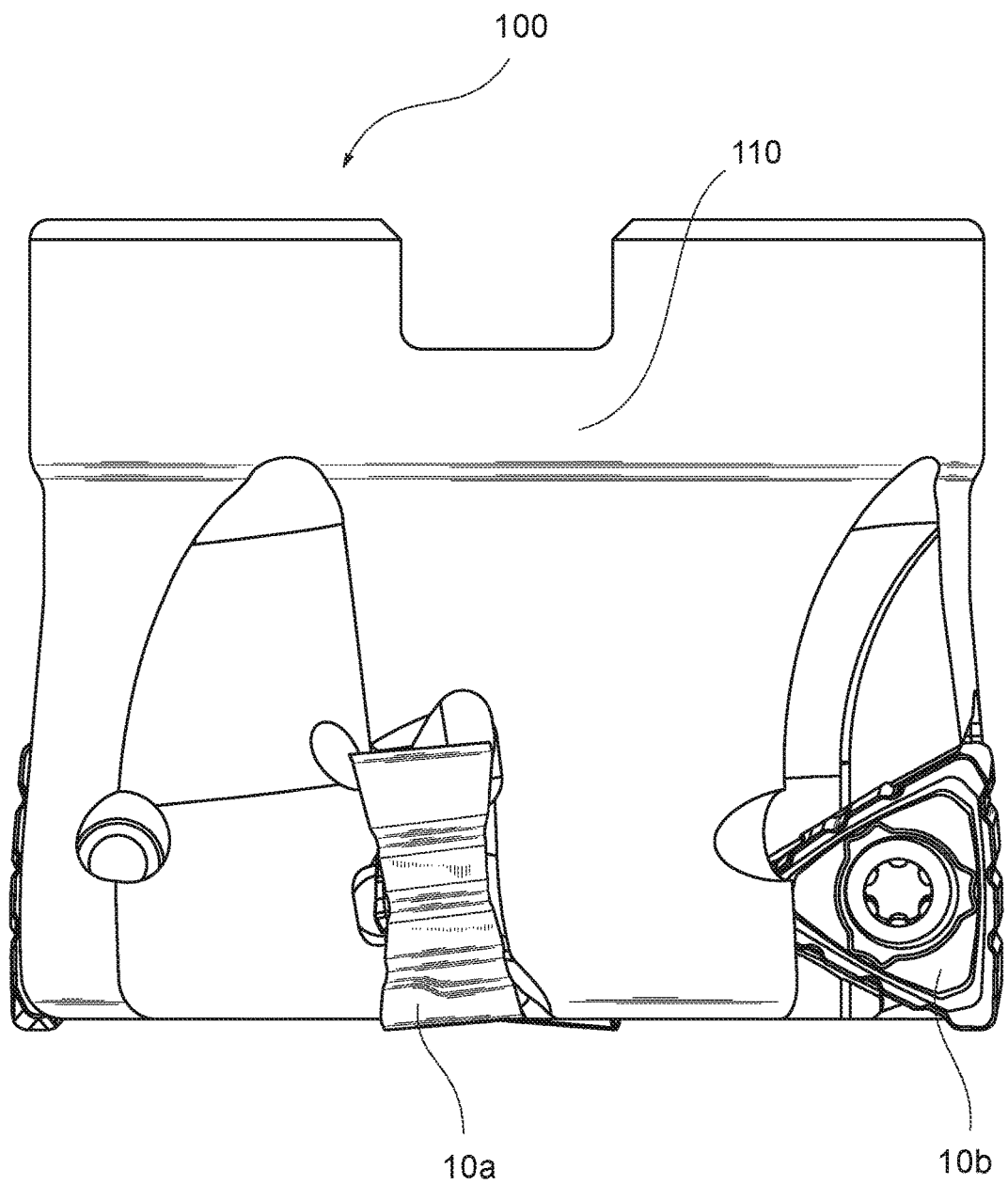
FIG. 8 is a front view of an indexable cutting tool according to the first embodiment of the present invention on which the cutting inserts of FIG. 1 are mounted.
Figure 9:
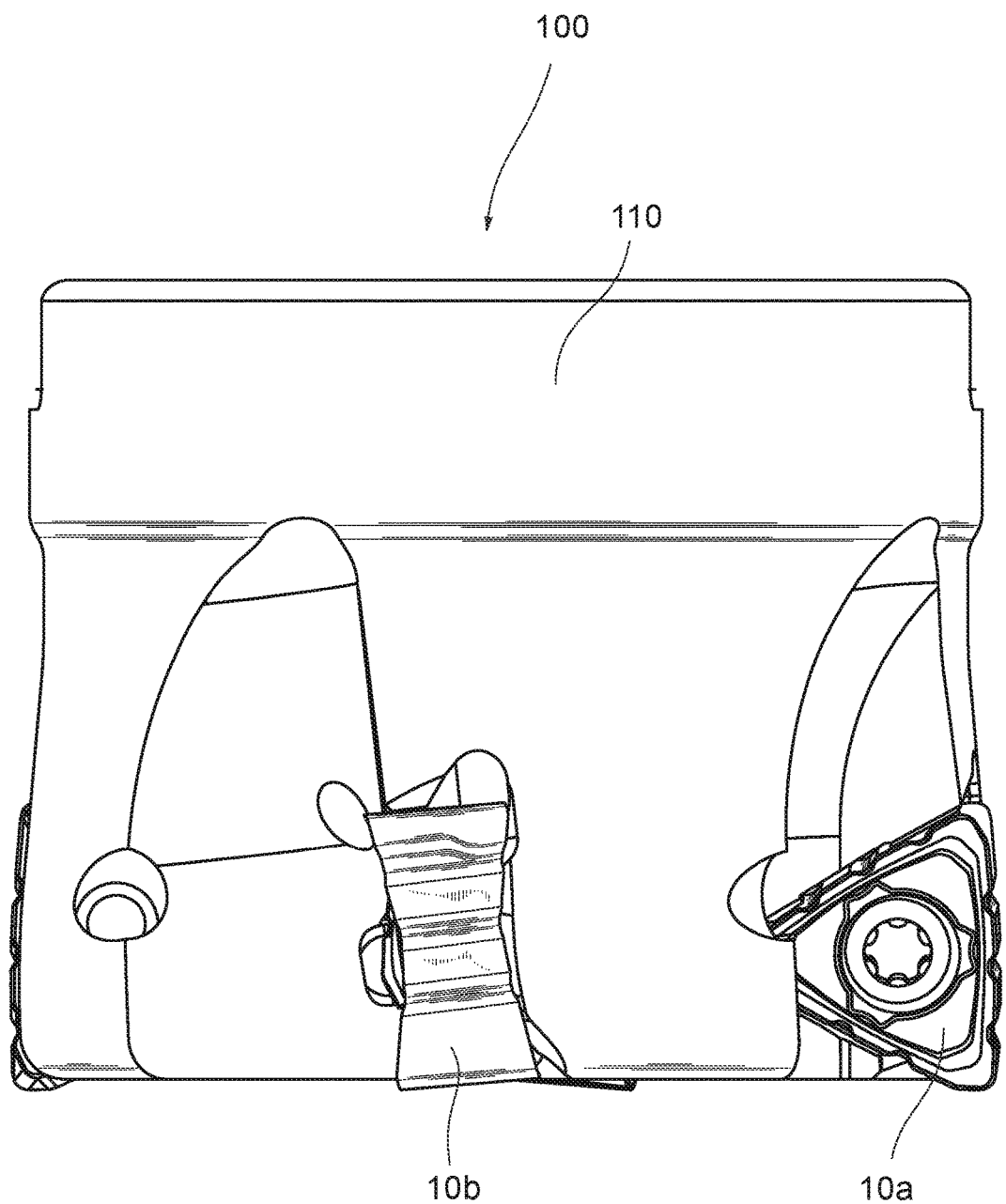
FIG. 9 is a side view of the indexable cutting tool of FIG. 6.

Next, an indexable cutting tool 100 on which the above-described cutting insert 10 is mounted will be described. As shown in FIGS. 8 and 9, the cutting tool 100 comprises the above-described cutting inserts 10 and a substantially cylindrical body 110. The body 110 has a rotational axis extending from a leading end thereof to a base end thereof and is configured so as to be used while being rotated relative to a workpiece around the rotational axis. Four insert mounting parts for the mounting of cutting inserts 10 are formed in an outer periphery of the leading end (leading end side portion) of the body 110. Two cutting inserts 10a, out of the four cutting inserts 10 mounted on the four insert mounting parts, are each mounted on the insert mounting part such that the upper surface 20 serves as a rake surface while the remaining cutting inserts, i.e., two cutting inserts 10b are each mounted on the insert mounting part such that the lower surface 30 serves as a rake surface. The cutting inserts 10a and the cutting inserts 10b are alternately arranged. With such arrangement, as shown in FIG. 7, rotational trajectories of the upper cutting edges 21 formed in the upper surface 20 and rotational trajectories of the lower cutting edges 31 in the lower surface 30 are superimposed while deviating from each other. That is, portions which are not cut due to the nicks 41 during the cutting with the active upper cutting edge 21 can be cut by the active lower cutting edge 31. Similarly, portions which are not cut due to the nicks 41 during the cutting with the active lower cutting edge 31 can be cut by the active upper cutting edge 21. As to the radial direction around the rotational axis of the indexable cutting tool 100, the cutting insert 10 is mounted so as to be inclined forward in a rotating direction, heading to the center of the indexable cutting tool 100. When the cutting insert 10 is mounted in this manner, the peripheral side surface 40 of the cutting insert 10 can be prevented from coming into contact with a surface of the workpiece.

Next, the operation and effects of the cutting insert 10 and the indexable cutting tool 100 on which the cutting insert 10 is mounted in the present embodiment will be described below. The cutting insert 10 is a so-called negative type cutting insert in which the side edges of the respective upper and lower surfaces can be used as cutting edges, and thus, the three upper cutting edges 21 and the three lower cutting edges 31 are respectively formed in the upper and lower surfaces. Therefore, the cutting insert 10 can be used six times in total, which is economical.

The nick 41b arranged closest to the corner cutting edge 22a of the upper cutting edge 21 has a shape having portions which each extend with a constant width (the first linear groove part 42a and the second linear groove part 42c) and a widening portion (the width varying part 42b), and thus, the groove width W1 at the opening which is opened in the upper surface 20 is different from the groove width W2 at the opening which is opened in the lower surface 30 and is smaller than the groove width W2. To put it another way, the nick 41b makes different sizes of notches respectively in the upper cutting edge 21 formed in the upper surface 20 and the lower cutting edge 31 formed in the lower surface 30, and thus, the upper cutting edge 21 of the upper surface 20 has a length different from that of the lower cutting edge 31 of the lower surface 30, and the length of the upper cutting edge 21 is longer than that of the lower cutting edge 31. This invites a difference in size between the cutting resistance applied to the cutting insert 10 which is placed such that the upper surface 20 serves as a rake surface and the cutting resistance applied to the cutting insert 10 which is placed such that the lower surface 30 serves as a rake surface. That is, the cutting resistance applied to the cutting insert 10a in which the upper cutting edge 21 serves as an active cutting edge is greater than the cutting resistance applied to the cutting insert 10b in which the lower cutting edge 31 serves as an active cutting edge. Different sizes of cutting resistances are intermittently applied to the indexable cutting tool 100 during cutting, and this can prevent the occurrence of periodic vibration which resonates with the natural frequency of the indexable cutting tool 100. As a result, it is possible to prevent chattering deriving from such resonance from being caused.

In the side view of the cutting insert 10 shown in FIG. 5, the virtual edge constituted by the upper cutting edge 21 and the intersecting edge between the upper surface 20 and the nicks 41 has, on the whole, a shape recessed from the upper surface 20 toward the lower surface 30. Further, the lowest point P of the virtual edge is near the mid-point between the two corners 28a and 28b when seen from a side view. In the case of such shape, the direction of the flow of chips flowing from the first inclined part 21a of the upper cutting edge 21 and the direction of the flow of chips flowing from the second inclined part 21b of the upper cutting edge 21 are not directions which are perpendicular, respectively, to the first inclined part 21a and the second inclined part 21b (a direction parallel to the axis A2 in the top view of FIG. 3) and instead face in a direction slightly inclined toward the center of the upper cutting edge 21. In other words, when performing cutting with the upper cutting edge 21, both the right and left portions of chips tend to flow in the direction toward the center of the cutting insert 10. Thus, intrinsically, chips cluster together at the center of the cutting insert 10, and this hinders chips from being discharged smoothly, inviting, for example, an increase in cutting resistance. However, the formation of the nicks 41 allows chips to be separated into small pieces, and this substantially eliminates mutual interference of the flows between the chips flowing from the first inclined part 21a and the chips flowing from the second inclined part 21b. Further, since the lowest point P is included in the intersecting edge between the bottom of the nick 41a and the upper surface 20, an area around the lowest point P where stress is most prone to concentrate during cutting is not involved in cutting, meaning that a large amount of stress will not be generated in such area.

Although an embodiment of the present invention has been described above, the present invention is not limited to the above embodiment, and various modifications may be made to the present invention. In other words, any cutting insert in which: upper and lower surfaces thereof are provided with cutting edges; and a width of an opening of a nick in the upper surface is different from that of an opening thereof in the lower surface, may be employed, even if the other portions of such cutting insert are shaped differently from the above embodiment. For example, although the nick 41 of the above-described cutting insert 10 has the second linear groove part 42c, the nick 41 may be shaped such that the width varying part 42b extends so as to reach the lower surface 30 without the formation of the second linear groove part 42c. Further, the first linear groove part 42a may be formed so as to extend in a direction inclined with respect to the axis A1.

In the above-described embodiment, the basic shape of the upper surface 20 and the lower surface 30 is a triangular shape but it may instead be another polygonal shape such as a quadrangular shape. When, as in the cutting insert 10, the basic shape of the upper and lower surfaces is a triangular or quadrangular shape, the cutting insert may be designed so as to be suited for square shoulder milling regarding which the discharge of chips is important, as described above. In such case, the above effect functions more effectively.

In the above-described embodiment and modifications, etc., the present invention has been described specifically in a given way, but the present invention is not limited to the described embodiment. It should be appreciated that various alterations and changes can be made to the present invention without departing from the spirit and scope of the invention defined in the scope of the claims. That is, the present invention encompasses all kinds of modifications, applications and equivalents which are encompassed by the idea of the present invention defined by the scope of the claims.

REFERENCE SIGNS LIST

10 Cutting insert
20 Upper surface
21 Cutting edge of the upper surface
30 Lower surface
31 Cutting edge of the lower surface
40 Peripheral side surface
41 Nick
42a First linear groove part
42b Width varying part
42c Second linear groove part
42bA Edge
42bB Edge
50 Through hole
100 Indexable cutting tool

What is claimed is:
1. A cutting insert comprising:
a first end surface and a second end surface which are opposed to each other;
a peripheral side surface which connects the first end surface and the second end surface;
a first cutting edge which is formed in an intersecting edge between the first end surface and the peripheral side surface;
a second cutting edge which is formed in an intersecting edge between the second end surface and the peripheral side surface; and
at least one groove which is formed in the peripheral side surface and in which, while one end thereof reaches the first end surface, another end thereof reaches the second end surface,
wherein a predetermined groove from among the at least one groove divides the first cutting edge into portions and divides the second cutting edge into portions, and is formed such that an opening width in the first end surface is different from an opening width in the second end surface, and
the predetermined groove includes:
a linear groove part which extends with a constant width; and
a width varying part which leads to the linear groove part and has a width that varies.

2. The cutting insert according to claim 1, wherein the width varying part has a first edge which extends parallel to the linear groove part and a second edge which does not extend parallel to the first edge so as to involve a width variation.

3. The cutting insert according to claim 1, wherein:
the linear groove part is opened in the first end surface; and
the width varying part has a width different from a width of the linear groove part and further leads to a second linear groove part which is opened in the second end surface.

4. The cutting insert according to claim 1, wherein:
the first end surface has a substantially polygonal shape;
the first cutting edge comprises a corner cutting edge formed in a first corner and a major cutting edge which leads to the corner cutting edge and which extends toward a second corner adjacent to the first corner; and
when the cutting insert is viewed from a direction facing the peripheral side surface, the major cutting edge is formed so as to be curved in a recessed shape toward the second end surface and such that a portion thereof closest to the second end surface is located substantially at a mid-point between the first corner and the second corner.

5. The cutting insert according to claim 1, wherein:
a plurality of first cutting edges is provided in the intersecting edge between the first end surface and the peripheral side surface;
a plurality of second cutting edges is provided in the intersecting edge between the second end surface and the peripheral side surface; and
when defining a first axis which extends so as to penetrate the first end surface and the second end surface,
the plurality of first cutting edges related to the first end surface and the plurality of second cutting edges related to the second end surface are of rotational symmetry with respect to the first axis.

6. The cutting insert according to claim 1, wherein, when an end surface view of the first end surface and an end surface view of the second end surface are superimposed, an opening of the groove of the first end surface is not fully superimposed on an opening of the groove of the second end surface.

7. An indexable cutting tool comprising:
the cutting insert according to claim 1; and
a body comprising at least two insert mounting parts on each of which the cutting insert is removably mounted, wherein:
the cutting insert is fixed to a first insert mounting part, out of the at least two insert mounting parts, such that the first cutting edge serves as an active cutting edge; and
the cutting insert is fixed to a second insert mounting part, out of the at least two insert mounting parts, such that the second cutting edge serves as an active cutting edge.

* * * * *